(12) United States Patent
Chang (10) Patent No.: US 8,902,880 B2
(45) Date of Patent: Dec. 2, 2014

(54) LOCAL TERMINAL DEVICE AND METHOD FOR EXCHANGING VOIP SIGNALING

(75) Inventor: Yao-Wen Chang, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 689 days.

(21) Appl. No.: 13/209,447

(22) Filed: Aug. 15, 2011

(65) Prior Publication Data

US 2012/0314698 A1    Dec. 13, 2012

(30) Foreign Application Priority Data

Jun. 7, 2011    (TW) .............................. 100119742 A (51) Int. Cl.
| | | |
|---|---|---|
| H04L 12/66 | (2006.01) | |
| H04L 29/06 | (2006.01) | |
| H04L 29/12 | (2006.01) | |
| H04L 12/58 | (2006.01) | |

(52) U.S. Cl.
CPC ........ *H04L 65/1053* (2013.01); *H04L 61/1511* (2013.01); *H04L 61/301* (2013.01); *H04L 61/307* (2013.01); *H04L 61/2076* (2013.01); *H04L 51/28* (2013.01); *H04L 65/1073* (2013.01)
USPC ....................................................... 370/352

(58) Field of Classification Search
USPC ....................................................... 370/352
See application file for complete search history.

(56) References Cited

U.S. PATENT DOCUMENTS

| | | | |
|---|---|---|---|
| 6,614,774 B1 * | 9/2003 | Wang ............................ | 370/338 |
| 6,847,704 B1 * | 1/2005 | Cherchali et al. .......... | 379/93.05 |
| 2002/0143989 A1 * | 10/2002 | Huitema et al. .............. | 709/243 |
| 2004/0264439 A1 * | 12/2004 | Doherty et al. ............... | 370/352 |
| 2005/0091402 A1 * | 4/2005 | Satagopan et al. ............ | 709/245 |
| 2008/0162724 A1 * | 7/2008 | Hietasarka .................... | 709/245 |
| 2009/0106453 A1 * | 4/2009 | Miura ........................... | 709/245 |
| 2011/0228761 A1 * | 9/2011 | Miyata et al. ................. | 370/352 |
| 2012/0207152 A1 * | 8/2012 | Chang .......................... | 370/356 |

FOREIGN PATENT DOCUMENTS

| | | |
|---|---|---|
| CN | 1406045 | 3/2003 |
| CN | 1960289 | 5/2007 |
| CN | 102026162 | 4/2011 |
| EP | 2472984 A1 | 9/2010 |
| TW | 513871 | 12/2002 |
| TW | 550898 | 9/2003 |

* cited by examiner

*Primary Examiner* — Nicholas Jensen
(74) *Attorney, Agent, or Firm* — Novak Druce Connolly Bove + Quigg LLP (57) ABSTRACT

A local terminal device receives a local mail address of a local user, and converts the local mail address into a local domain name. The local terminal device transmits the local domain name and a local Internet protocol (IP) address to a dynamic domain name serve (DDNS) server to register with the DDNS server. The local terminal device receives a remote mail address of a remote user, and converts the remote mail address into a remote domain name. The local terminal device queries the DDNS server for a remote IP address corresponding to the remote domain name. The local terminal device exchanges VoIP signaling with a remote terminal device according to the remote IP address.

5 Claims, 6 Drawing Sheets

LOCAL TERMINAL DEVICE AND METHOD FOR EXCHANGING VOIP SIGNALING

BACKGROUND

1. Technical Field

The present disclosure relates to voice over Internet protocol (VoIP) communications, and more particularly to a local terminal device and a method for exchanging VoIP signaling.

2. Description of Related Art

Voice over Internet protocol (VoIP) is an IP telephony term for a set of facilities used to manage the delivery of voice information over the Internet. A VoIP system often needs one or more media gateway controllers (MGCs) to exchange VoIP signaling. However, the one or more MGCs are very expensive.

Therefore, a heretofore unaddressed need exists in the VoIP system to overcome the aforementioned deficiencies and inadequacies.

BRIEF DESCRIPTION OF THE DRAWINGS

The details of the disclosure, both as to its structure and operation, can be best understood by referring to the accompanying drawings, in which like reference numbers and designations refer to like elements.

DETAILED DESCRIPTION

All of the processes described may be embodied in, and fully automated via, software code modules executed by one or more general purpose computers or processors. The code modules may be stored in any type of computer-readable medium or other storage device. Some or all of the methods may alternatively be embodied in specialized computer hardware or communication apparatus.

In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
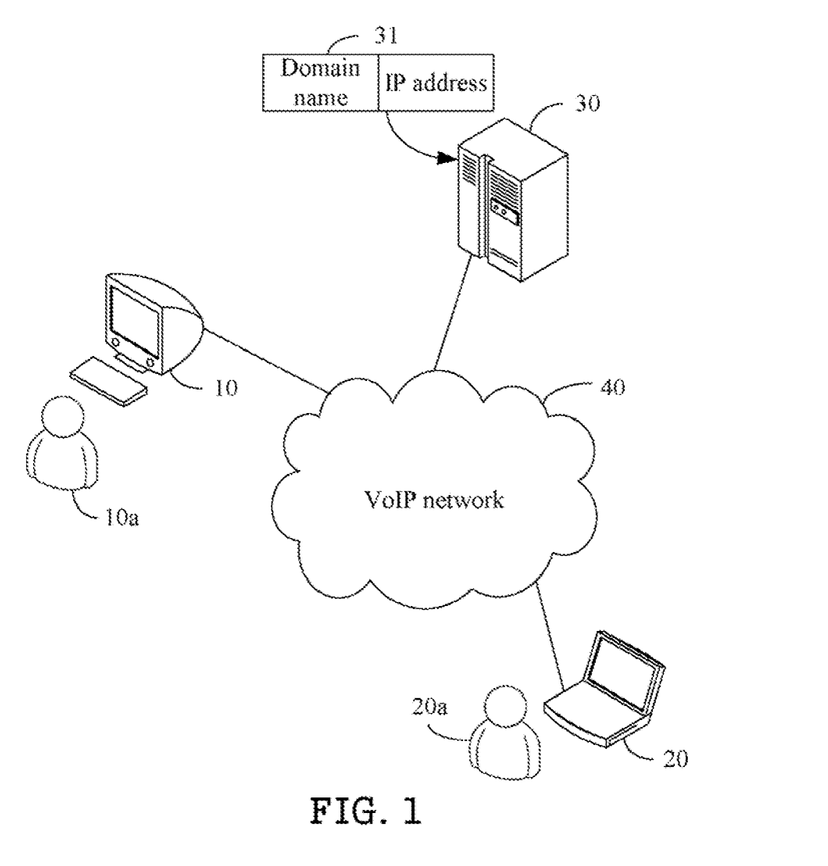
FIG. 1 is a schematic diagram of an application environment of one embodiment of a voice over Internet protocol (VoIP) communication system including a local terminal device in accordance with the present disclosure.

FIG. 1 is a schematic diagram of an application environment of one embodiment of a voice over Internet protocol (VoIP) communication system including a local terminal device 10 in accordance with the present disclosure. In one embodiment, the VoIP communication system includes a plurality of terminal devices, such as the local terminal device 10 and a remote terminal device 20, and a dynamic domain name service (DDNS) server 30. The plurality of terminal device 10, 20 are in electronic communication with the DDNS server 30 via a VoIP network 40. The plurality of terminal devices 10, 20 may be IP phones, notebook computers, tablet computers, or desktop computers, for example.

The DDNS server 30 includes a mapping table 31. The mapping table 31 is a file (.txt, xls, etc.), and is operable to record domain names and IP addresses of the terminal devices 10, 20 when the terminal devices 10, 20 registers with the DDNS server 30. The mapping table 31 includes a domain name field and an IP address field, respectively operable to record the domain names and the IP addresses of the terminal devices 10, 20.

In one exemplary embodiment, the local terminal device 10 has a local user 10a and a local IP address. The local user 10a has a local mail address that can be used to identify an email box to which email messages are delivered. An example format of the local mail address may be aaa@foxconn.com. When receiving a local mail address of the local user 10a input by the local user 10a, the local terminal device 10 converts the local mail address into a local domain name according to a hash function, and transmits the local domain name and the local IP address to the DDNS server 30 to register with the DDNS server 30. In one embodiment, the hash function includes combining characters of the local mail address with a predefined string, such as ".myvoip.net", to form the local domain name. For example, assuming that the local mail address is aaa@foxconn.com, the local domain name is aaafoxconncom.myvoip.net. After receiving the local domain name and the local IP address from the local terminal device 10, the DDNS server 30 records the local domain name and the local IP address in the mapping table 31.

In one exemplary embodiment, the remote terminal device 20 has a remote user 20a and a remote IP address. The remote user 20a has a remote mail address that can be used to identify an email box to which email messages are delivered. An example format of the remote mail address may be bbb@foxconn.com. When receiving a remote mail address of the remote user 20a input by the remote user 20a, the remote terminal device 20 converts the remote mail address into a remote domain name according to the hash function, and transmits the remote domain name and the remote IP address to the DDNS server 30 to register with the DDNS server 30. In one embodiment, the hash function includes combining characters of the remote mail address with the predefined string, such as ".myvoip.net", to form the remote domain name. For example, assuming that the remote mail address is bbb@foxconn.com, the remote domain name is bbbfoxconncom.myvoip.net. After receiving the remote domain name and the remote IP address from the remote terminal device 20, the DDNS server 30 records the remote domain name and the remote IP address in the mapping table 31.

When the local user 10a wants to engage in a VoIP communication with the remote user 20a, the local user 10a can use the local terminal device 10 to call the remote terminal device 20. In such a case, the local terminal device 10 receives the remote mail address of the remote user 20a input by the local user 10a, and then converts the remote mail address into the remote domain name according to the hash function. Afterwards, the local terminal device 10 queries the DDNS server 30 for the remote IP address corresponding to the remote domain name. After receiving the remote IP address from the DDNS server 30, the local terminal device 10 exchanges VoIP signaling with the remote terminal device 20 according to the remote IP address. Afterwards, the local user 10a can enjoy a VoIP communication with the remote user 20a via the local terminal device 10 and the remote terminal device 20.

It should be noted that the local terminal device 10 can store the remote IP address corresponding to the remote domain name that are successfully queried from the DDNS server 30 in a cache of the local terminal device 10. Thus, the local terminal device 10 can obtain the same remote IP address corresponding to the same remote domain name from the cache, and does not need to re-query the DDNS server 30 for the same remote IP addresses corresponding to the same remote domain names.

In general, the local terminal device 10 can exchange VoIP signaling with the remote terminal device 20 without any media gateway controller (MGC), so the cost is reduced.

Figure 2:
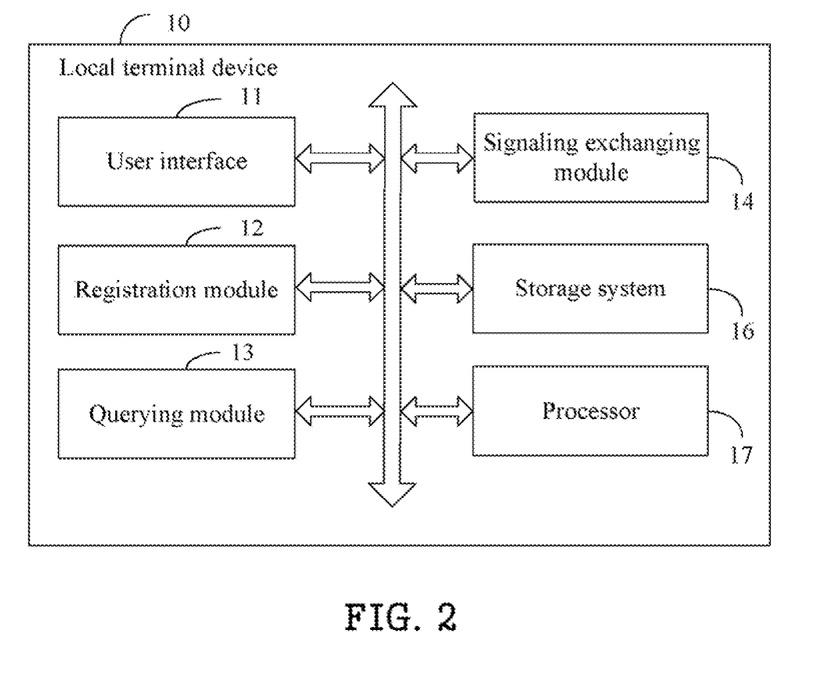
FIG. 2 is a schematic diagram of one embodiment of the local terminal device including functional modules in accordance with the present disclosure.

FIG. 2 is a schematic diagram of one embodiment of the local terminal device 10 including functional modules in accordance with the presentation disclosure. In one embodiment, functional modules of the local terminal device 10 is the same as those of the remote terminal device 20, so only the functional modules of the local terminal device 10 are described hereinafter.

The local terminal device 10 includes a user interface 11, a registration module 12, a querying module 13, a signaling exchanging module 14, a storage system 16, and at least one processor 17.

The modules 12-14 may comprise computerized code in the form of one or more programs that are stored in the storage system 16. The computerized code includes instructions that are executed by the at least one processor 17 to provide functions for the modules 12-14. In one example, the storage system 16 may include a hard disk drive, a flash memory, a cache or another computerized memory device.

The user interface 11 is operable to receive a local mail address of the local user 10a input by the local user 10a. In one example, the local user 10a can manually input the local mail address of the local user 10a to the user interface 11. In another example, the local user 10a can store a plurality of local mail addresses of the local user 10a, and then select one required local mail addresses from the plurality of local mail addresses. The user interface 11 is displayed on a display (not shown).

The registration module 12 is operable to convert the local mail address into a local domain name according to a hash function, and transmit the local domain name and a local IP address to the DDNS server 30 to register with the DDNS server 30. In one embodiment, the hash function includes combining characters of the local mail address with a predefined string such as ".myvoip.net" to form the local domain name. For example, assuming that the local mail address is aaa@foxconn.com, the local domain name is aaafoxconncom.myvoip.net.

When the local user 10a calls the remote user 20a via the local terminal device 10 and the remote terminal device 20, the user interface 11 is further operable to receive a remote mail address of the remote user 20a input by the local user 10a. The querying module 13 is operable to convert the remote mail address into a remote domain name according to the hash function, and query the DDNS server 30 for the remote IP address corresponding to the remote domain name.

The storage system 16 may include a plurality of history remote IP addresses corresponding to a plurality of history remote domain names. The plurality of history remote IP addresses are a list of IP addresses that are successfully queried from the DDNS server 30. The querying module 13 is further operable to determine whether the remote IP address corresponding to the remote domain name is found in the storage system 16. The querying module 13 obtains the remote IP address from the storage system 16 when the remote IP address is found in the storage system 16. The querying module 13 queries the DDNS server 30 for the remote IP address corresponding to the remote domain name when the remote IP address is not found in the storage system 16.

The signaling exchanging module 14 is operable to exchange VoIP signaling with the remote terminal device 20 according to the remote IP address. Then, the local user 10a can enjoy a VoIP communication with the remote user 20a via the local terminal device 10 and the remote terminal device 20.

Figure 3:
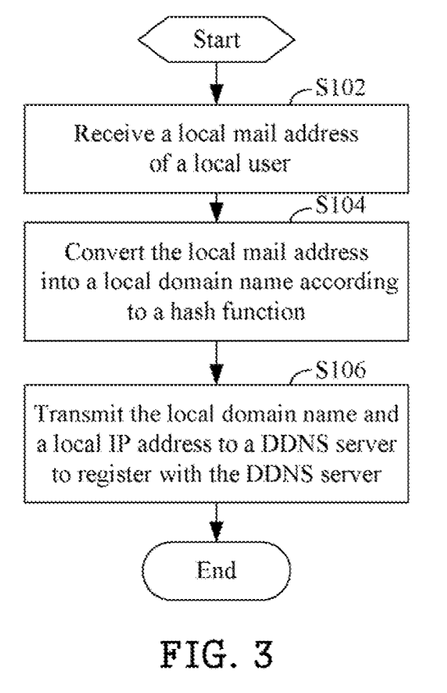
FIG. 3 is a flowchart of one embodiment of a registration method of the local terminal device in accordance with the present disclosure.

FIG. 3 is a flowchart of one embodiment of a registration method of the local terminal device 10 in accordance with the present disclosure.

In block S102, the user interface 11 receives a local mail address of the local user 10a input by the local user 10a.

In block S104, the registration module 12 converts the local mail address into a local domain name according to a hash function.

In block S106, the registration module 12 transmits the local domain name and the local IP address to the DDNS server 30 to register with the DDNS server 30.

Figure 4:
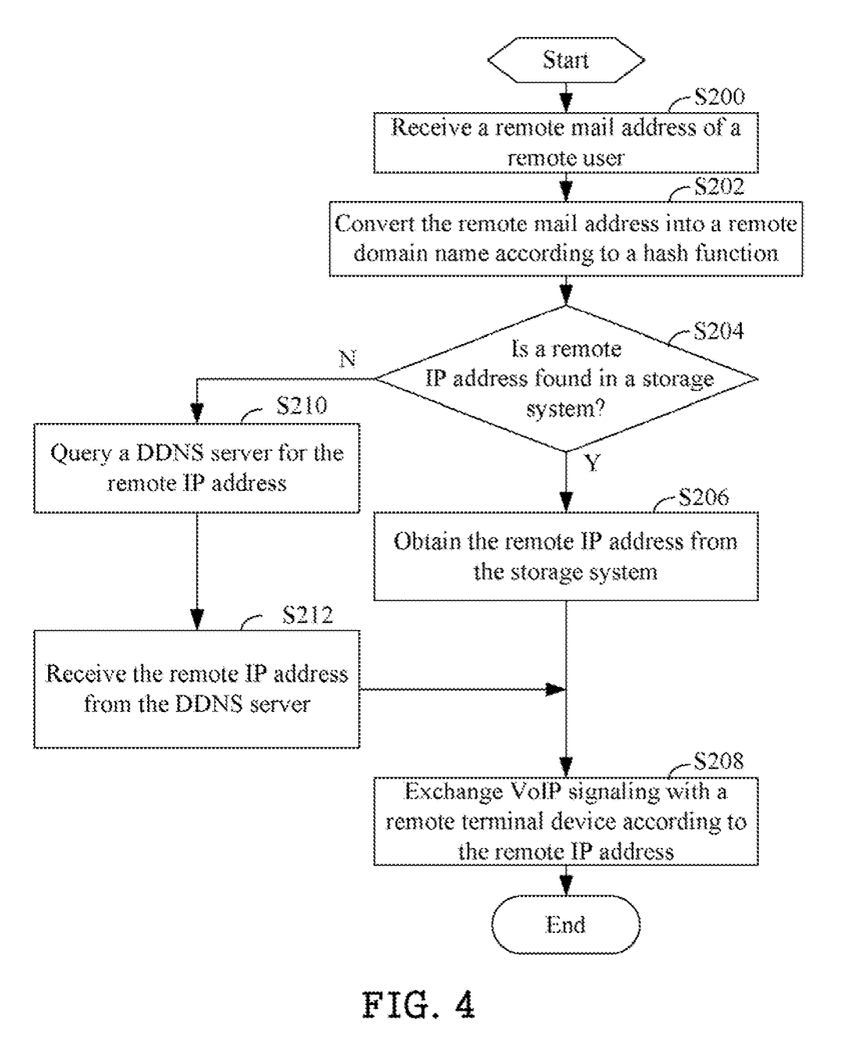
FIG. 4 is a flowchart of one embodiment of a method for exchanging voice over Internet protocol (VoIP) signaling of the local terminal device in accordance with the present disclosure.

FIG. 4 is a flowchart of one embodiment of a method for exchanging VoIP signaling of the local terminal device 10 in accordance with the present disclosure.

In block S200, the user interface 11 receives a remote mail address of the remote user 20a input by the local user 10a.

In block S202, the querying module 13 converts the remote mail address into a remote domain name according to the hash function.

In block S204, the querying module 13 determines whether a remote IP address corresponding to the remote domain name is found in the storage system 16.

In block S206, the querying module 13 obtains the remote IP address corresponding to the remote domain name from the storage system 16 if the remote IP address is found in the storage system 16.

In block S210, the querying module 13 queries the DDNS server 30 for the remote IP address corresponding to the remote domain name if the remote IP address is not found in the storage system 16.

In block S212, the querying module 13 receives the remote IP address from the DDNS server 30.

In block S208, the signaling exchanging module 14 exchanges VoIP signaling with the remote terminal device 20 according to the remote IP address.

Figure 5:
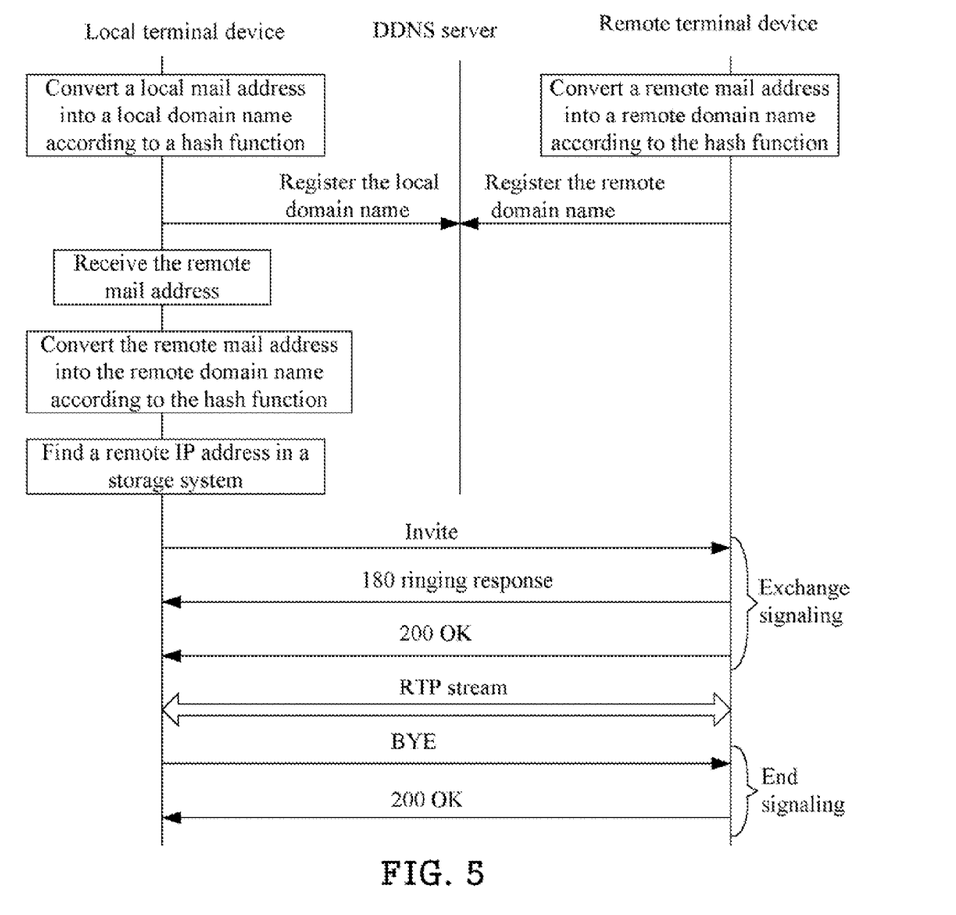
FIG. 5 is a transport diagram of one embodiment of a method for exchanging VoIP signaling in accordance with the present disclosure.

FIG. 5 is a transport diagram of one embodiment of a method for exchanging VoIP signaling in accordance with the present disclosure. In one embodiment, the local user 10a calls the remote user 20a via the local terminal device 10 and the remote terminal device 20.

Initially, the local terminal device 10 receives a local mail address of the local user 10a input by the local user 10a, converts the local mail address into a local domain name according to a hash function, and transmits the local domain name and a local IP address to the DDNS server 30 to register with the DDNS server 30.

Simultaneously, the remote terminal device 30 receives a remote mail address of the remote user 20a input by the remote user 20a, converts the remote mail address into a remote domain name according to the hash function, and transmits the remote domain name and the remote IP address to the DDNS server 30 to register with the DDNS server 30.

When the local user 10a calls the remote user 20a, the local terminal device 10 receives the remote mail address of the remote user 20a input by the local user 10a, and converts the remote mail address into the remote domain name according to the hash function.

Then, the local terminal device 10 determines whether the remote IP address corresponding to the remote domain name is found in the storage system 16.

The local terminal device 10 obtains the remote IP address corresponding to the remote domain name from the storage system 16 if the remote IP address is found in the storage system 16.

Then, the local terminal device 10 exchanges VoIP signaling with the remote terminal device 20 according to the remote IP address. In detail, the local terminal device 10 transmits an invite to the remote terminal device 20, and receives a 180 ringing response and 200 OK from the remote terminal device 20.

Then, the local terminal device 10 enjoys a VoIP communication with the remote terminal device 20. That is, the local terminal device 10 transmits real-time transport (RTP) stream to and receives RTP stream from the remote terminal device 20.

When the VoIP communication is ended, the local terminal device 10 ends the VoIP signaling with the remote terminal device 20. That is, the local terminal device 10 transmits Bye to the remote terminal device 20, and receives 200 OK from the remote terminal device 20.

Figure 6:
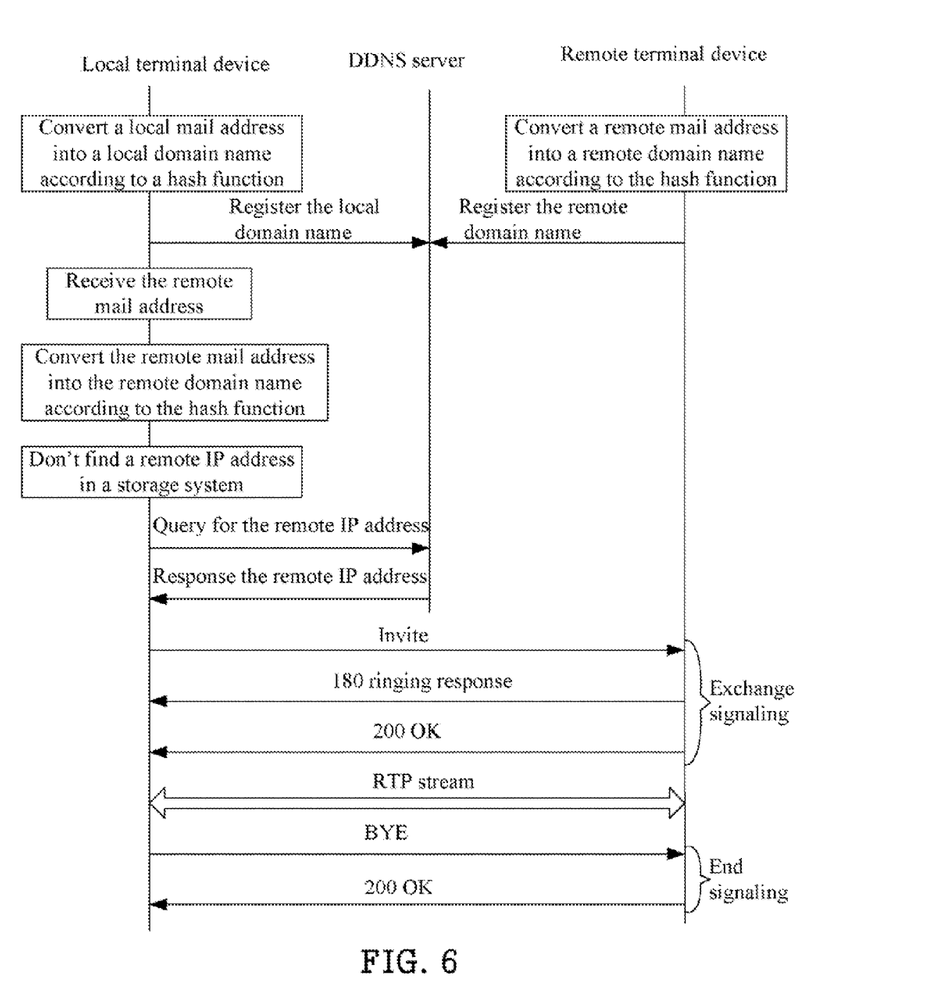
FIG. 6 is a transport diagram of another embodiment of a method for exchanging VoIP signaling in accordance with the present disclosure.

FIG. 6 is a transport diagram of another embodiment of a method for exchanging VoIP signaling in accordance with the present disclosure. The method of FIG. 6 is similar to that of the FIG. 5, and the difference is the means for obtaining the remote IP address corresponding to the remote domain name. In this embodiment, the remote IP address corresponding to the remote domain name is not found in the storage system 16, so the local terminal device 10 queries the DDNS server 30 for the remote IP address corresponding to the remote domain name and receives the remote IP address from the DDNS server 30. Other transport blocks of FIG. 6 is the same as those of FIG. 5, so descriptions are omitted.

Thus, the local terminal device 10 can exchange the VoIP signaling with the remote terminal device 20 without any MGC, so the cost is reduced.

While various embodiments of the present disclosure have been described above, it should be understood that they have been presented using example and not using limitation. Thus the breadth and scope of the present disclosure should not be limited by the above-described embodiments, but should be defined in accordance with the following claims and their equivalents.

What is claimed is:

1. A local terminal device in electronic communication with a dynamic domain name service (DDNS) server and a remote terminal device via a voice over Internet protocol (VoIP) network, the local terminal device having a local Internet protocol (IP) address, the remote terminal device having a remote IP address, the local terminal device comprising:
a user interface operable to receive a local mail address of a local user and a remote mail address of a remote user;
at least one processor;
a storage system to store one or more programs executable by the at least one processor, the one or more programs comprising instructions for:

converting the local mail address into a local domain name according to a first hash function and transmitting the local domain name and the local IP address to the DDNS server to register with the DDNS server, wherein the first hash function comprises combining characters of the local mail address and a predefined string to form the local domain name;
converting the remote mail address into a remote domain name according to a second hash function and querying the DDNS server for the remote IP address corresponding to the remote domain name, wherein the second hash function comprises combining characters of the remote mail address and a predefined string to form the remote domain name; and
exchanging VoIP signaling with the remote terminal device according to the remote IP address.

2. The local terminal device of claim 1, wherein the storage system comprises a plurality of history remote IP addresses corresponding to a plurality of history remote domain names, wherein the plurality of history remote IP addresses are a list of IP addresses that are successfully queried from the DDNS server.

3. The local terminal device of claim 2, wherein the one or more software programs further comprises instructions for:
determining whether the remote IP address corresponding to the remote domain name is found in the storage system, obtaining the remote IP address from the storage system when the remote IP address is found in the storage system, and querying the DDNS server for the remote IP address when the remote IP address is not found in the storage system.

4. A method for exchanging voice over Internet protocol (VoIP) signaling of a local terminal device in electronic communication with a dynamic domain name service (DDNS) server and a remote terminal device via a VoIP network, the local terminal device having a local Internet protocol (IP) address, the remote terminal device having a remote IP address, the method comprising:
receiving a local mail address of a local user;
converting the local mail address into a local domain name according to a first hash function and transmitting the local domain name and the local IP address to the DDNS server to register with the DDNS server, wherein the first hash function comprises combining characters of the local mail address and a predefined string to form the local domain name;
receiving a remote mail address of a remote user;
converting the remote mail address into a remote domain name according to a second hash function and querying the DDNS server for the remote IP address corresponding to the remote domain name, wherein the second hash function comprises combining characters of the remote mail address and a predefined string to form the remote domain name; and
exchanging VoIP signaling with the remote terminal device according to the remote IP address.

5. The method of claim 4, further comprising:
providing a storage system operable to store a plurality of history remote IP addresses corresponding to a plurality of history remote domain names, wherein the plurality of history remote IP addresses are a list of IP addresses that are successfully queried from the DDNS server;
determining whether the remote IP address corresponding to the remote domain name is found in the storage system;
obtaining the remote IP address from the storage system if the remote IP address is found in the storage system; and querying the DDNS server for the remote IP address corresponding to the remote domain name if the remote IP address is not found in the storage system.

* * * * *